Patented June 27, 1944

2,352,172

UNITED STATES PATENT OFFICE 2,352,172

PROTECTIVE AND DECORATIVE COATING

László Auer, East Orange, N. J., assignor to Ridbo Laboratories, Inc., Paterson, N. J., a corporation of New Jersey No Drawing. Application November 25, 1941, Serial No. 420,346

11 Claims. (Cl. 106—220)

This invention relates to protective and decorative coatings, and especially to varnishes and paints containing a drying, film-forming ingredient, which ingredient heretofore customarily consisted of or included a drying or semi-drying oil. The drying of such coatings relies in large part on the action of oxygen when the coating is exposed to the air. Wherever (as is customary in paints) volatile solvents are included in the vehicle, drying by evaporation also takes place.

The present invention contemplates a new and improved composition for "oxygen-drying" (air drying) protective and decorative coatings, the new composition being particularly suitable for relatively inexpensive paints such as "one-coat" interior architectural paints, for example—gloss paints and flat wall paints.

The drying oils, for instance linseed oil, commonly used in certain classes of paints are relatively expensive, in view of which, for inexpensive paints, it has been common to substitute the less expensive semi-drying oils, for example soya bean oil, fish oils (menhaden or sardine oils), in place of the more expensive drying oils, such as linseed oil. Whether such paints (containing semi-drying oils, or other substitutes for drying oils) are applied in one or more coats, and especially where effective coverage is expected from a single coat, the quality of the protective coating is impaired in certain respects (as compared with paints containing high quality drying oils), and notably in the respect discussed just below. The reason why especial difficulty is encountered where effective coverage is expected from a single coat is that "one-coat" work requires application of a thicker layer than where several coats are used, and one thick coat dries on and through more slowly and less completely.

It is found that at least certain components of the semi-drying ingredient "sweat out," usually subsequently to the initial drying, producing a sticky surface, probably due to synaeresis. This effect is more pronounced when the paint is applied on a humid or "bad drying" day. Even if the atmospheric conditions at the time of application of the coating are ideal for drying and apparently produce good initial drying, re-liquefying and sweating out of components of the drying ingredient will frequently take place as long as several months or more following application of the coating, this effect usually being manifested in a period of hot and/or humid weather.

I have found that a good quality inexpensive paint, highly effective and satisfactory even for one-coat work, may be made by replacing the semi-drying or drying oils (or other drying ingredients heretofore used) with a rosin-terpene hydrocarbon mixture, the replacement being total or partial, and preferably at least in major part. Even where a substantial quantity of semi-drying oil is used conjointly with said rosin-terpene hydrocarbon mixture, the tendency for the semi-drying oil to re-liquefy and sweat out is virtually completely eliminated. (What I herein refer to as a rosin-terpene hydrocarbon mixture will be brought out more fully hereinafter.)

Moreover, the employment of a rosin-terpene hydrocarbon mixture, as a drying ingredient, imparts to the paint other desirable characteristics, including high wetting power, and quick top-drying coupled with good through-drying.

When properly formulated, the top- and through-drying characteristics of a paint in accordance with this invention are such that the paint may effectively be used for one-coat work without surface wrinkling and with excellent through-drying, even where a heavy layer is applied, as is necessary for complete coverage in one coat.

With respect to the matter of cost of ingredients, it is noted that an economic gain results not only from use of the rosin-terpene hydrocarbon mixture in substitution for oils, but also from the fact that at least some semi-drying oils of lower quality than has been practicable to use heretofore may be employed in combination with the rosin-terpene hydrocarbon mixture, since the re-liquefying which is most noticeable with the lower quality semi-drying oils is reduced or eliminated by virtue of their conjoint use with the rosin-terepene hydrocarbon mixture.

Where the rosin-terpene hydrocarbon mixture is used in combination with semi-drying oils, the latter may satisfactorily be employed in amounts ranging from about 100% to about 10% of the of the quantity of rosin-terpene hydrocarbon mixture. A ratio of about one part of semi-drying oil to four parts of said mixture has been found to give good results.

Attention is also called to the fact that where a paint containing a resinous ingredient (in addition to oils) would customarily be used, a substantially equivalent paint prepared in accordance with this invention may derive the characteristics normally expected from the resinous ingredient in part from the rosin-terpene hydrocarbon mixture. On this general subject it may be mentioned that the rosin-terpene hydrocarbon mixture cannot be considered either as a resin or an oil, since it partakes of the characteristics of both, and therefore cannot be substituted pound-for-pound for resin or oil in existing paint formulas.

In addition to advantages already noted, it may be mentioned that the rosin-terpene hydrocarbon mixture cuts very rapidly with solvents and oils, which is frequently of importance not only in initial preparation of the paint, but also in any subsequent cutting which may be desired.

In accordance with the preferred practice of the invention, the rosin-terpene hydrocarbon mixture is prepared preliminarily and thereafter introduced as such into the paint mix.

Several methods for initially providing the rosin-terpene hydrocarbon mixture are briefly described hereinafter. It is first noted, however, that both the rosin and terpene components are preferably derived from natural rosins such as gum and wood rosins.

In the preferred practice of the invention, the rosin is heated to a temperature between about 270° and 280° C., under a vacuum of from 100 to 600 mm. of mercury, in the presence of about 5% zinc carbonate, for a period of about 5 to 8 hours.

This treatment results in limited dicarboxylation of the rosin, leaving a mixture of rosin and terpene hydrocarbons in varying proportions, depending upon the nature and extent of treatment. This may be measured by the acid value of the material. Thus, with a typical rosin having an initial acid value of 160, the treatment is preferably carried out to reduce the acid value to a point lying between about 120 and 20. This range gives a mixture varying from about 75% to 12.5% rosin and from about 25% to 87.5% terpene hydrocarbons.

The treatment specifically referred to above gives an acid value of about 60–80 and, for many purposes, I have found that a desirable acid value range corresponds roughly to a 50–50 ratio between rosin and terpene hydrocarbons, i. e., an acid value between 70 and 85.

The treatment described above not only effects partial decarboxylation but, in addition, other changes are brought about, apparently because of colloidal transformations in the rosin (which I believe to be an isocolloid), in consequence of which the rosin is softened or liquefied. Rosin treated in accordance with the foregoing and having an acid number between about 60 or 70 and about 85 comprises a plastic or soft solid mass, with a cold flow. It further has high wetting power and good top- and through-drying characteristics.

The treatment to produce the rosin-terpene hydrocarbon mixture may be varied in a number of respects, as disclosed, for example, in my copending application Serial No. 386,371, filed April 1, 1941 (Patent No. 2,311,200, February 16, 1943) of which the present application is a continuation-in-part, and also disclosed in my prior applications Serial Nos. 318,650, filed February 12, 1940 (Patent No. 2,298,270, October 13, 1942); 446,171, filed April 21, 1930 (Patent 1,980,367, November 13, 1934); 359,425, filed April 30, 1929 (Patent 2,213,944, September 10, 1940); and 143,786, filed October 23, 1926 (Patent 2,189,772, February 13, 1940); all of which prior applications disclose similar treatment of rosin.

For the present purposes, I prefer to use zinc carbonate (as disclosed in said application 386,371) as a modifying agent in preparation of the rosin, although other agents may be employed, such as zinc chloride and agents disclosed in various of my earlier applications, for instance magnesium sulphate and ammonium iodide, as mentioned in application 386,371, and p-toluene sulphonic acid and p-toluene sulphochloride, as mentioned in my Patent 1,980,367. The quantity of modifying agent employed may be from an appreciable trace (fractional percentage) to about 30%, and preferably from a trace to about 10%.

The foregoing discussion of my preferred method for producing the "rosin-terpene hydrocarbon mixture" clarifies what I mean by that expression. In further explanation of this use of the terms "rosin" and "terpene hydrocarbons," it may be stated that by "rosin" I mean commercial gum rosin and/or wood rosin products, containing mixtures of rosin acids, known today as abietic acid, pyroabietic acid and d-pimaric acid, amongst others. By "terpene hydrocarbons" I mean terpene radicals of rosin acids, such as abietene, or high molecular residues of such terpene radicals of rosin acids. By the term "residue," used just above, I mean either the terpene molecule secured by a secondary splitting off of radicals (secondary to the primary decarboxylation), for instance, methyl groups, etc.; or the terpene molecule after changes in unsaturation (hydrogen content) of the original molecule; such products being obtained from rosin acids in the course of the treatment used to prepare the rosin-terpene hydrocarbon mixture.

It may be mentioned that typical rosins contain about 90% abietic acid.

Although my preferred method for producing the mixture also brings about other changes in the rosin under treatment, the "rosin-terpene hydrocarbon mixture" consists essentially or in major part of abietic acid and abietene in the ratios hereinbefore referred to.

A similar mixture of the same essential or basic composition may be secured in other ways. Thus, the heavy fractions of rosin distillation (rosin oil—consisting essentially of terpene hydrocarbons as above defined) may be remixed with rosin in about the proportions hereinbefore indicated.

As is known, rosin oil may be produced in a variety of ways, for instance, by distillation in a still at progressively increased temperatures, rosin spirits coming over at about 160° C., and then the heavier products or rosin oils, at temperatures ranging from about 200° C. to about 270° C. The heavy fractions are best suited to the present purposes.

In accordance with another method for producing rosin oil, rosin is heated at from 150° C. to 325° C. (preferably at about 300° C.), with 2% of a siliceous earth or of activated carbon.

Rosin oil produced in accordance with the foregoing or other known methods may be remixed with rosin in the desired proportions, in order to produce the rosin-terpene hydrocarbon mixture herein contemplated.

Although I prefer to preliminarily prepare the rosin-terpene hydrocarbon mixture and then add said mixture as such to the paint mix, it is to be understood that the two components of the mixture may be added to the paint mix individually under some circumstances.

EXAMPLE 1

An example of a flat wall paint prepared in accordance with this invention is as follows:

*Grinding mixture*

| | Pounds |
|---|---|
| Ti-Cal (titanium-calcium pigment) | 450 |
| $TiO_2$ | 100 |
| Surfex (surface treated calcium carbonate) | 400 |
| Asbestine | 100 |
| Alkali refined soya bean oil | 60 |
| Rosin-terpene hydrocarbon mixture | 110 |
| Kerosene | 98 |
| Mineral spirits | 52 |

After rough grinding of the foregoing mixture the remainder of the vehicle was added:

Reduction

|  | Pounds |
|---|---|
| 1% soap solution | 12 |
| Blown soya bean oil | 16 |
| Mineral spirits | 71 |
| 8% strong zinc drier | 2 |
| 24% strong lead drier | 4 |

A second rough grind followed.

Instead of the soya bean oil referred to in the above example, fish oils or heat-bodied linseed oil may be used.

EXAMPLE 2

An example of one-coat gloss paint is as follows:

|  | Pounds |
|---|---|
| Ti-Cal (titanium-calcium pigment) | 180 |
| TiO$_2$ | 20 |
| Surfex (surface treated calcium carbonate) | 200 |
| Rosin-terpene hydrocarbon mixture | 266.7 |
| Alkali refined soya bean oil | 133.3 |
| Mineral spirits | 60 |

The pigment mixture (Ti-Cal, TiO$_2$ and Surfex) was ground with about three-quarters of the vehicle solids (rosin-terpene hydrocarbon mixture and soya bean oil). Following this, the remainder of the vehicle solids were added and the mix again ground. Finally, the mineral spirits were added to dilute the mix to appropriate shipping consistency.

In addition to lead and cobalt driers, it is advantageous in Example 2 to use zinc or calcium driers, to enhance through-drying. In calculating the proper drier proportions, the rosin-terpene hydrocarbon mixture should be regarded as "oil content," since it requires driers for proper film formation.

In Example 2, the soya bean oil may be replaced with a substantially equal amount either of heavy-bodied linseed oil, or of processed fish oil (for instance, a fish oil treated with ester gum and containing about 85% solids and 15% mineral spirits). With such substitutions some variation in the quantity of mineral spirits might be desirable.

In addition to the two examples above, others were prepared generally following certain known paint formulas. Thus—

Example 3

The major or important ingredients of a known gloss paint formula are as follows:

54% pigment
- 47% titanium-calcium pigment, rutile
- 53% precipitated calcium carbonate 46% vehicle
- 74% solids (limed rosin, varnish linseed oil, ester gum treated fish oil (85% solids and 15% mineral spirits))
- 26% volatile (mineral spirits, etc.) (oil length about 11 gallons)

If in the foregoing formula, all of the linseed oil and part of the limed rosin are replaced by the rosin-terpene hydrocarbon mixture, to the extent of 68% of the vehicle solids, the paint has the following characteristics:

*Body of paint.*—Heavier than Standard
*Flow.*—More flow than Standard but no sagging
*Brushing properties.*—Slightly easier working than Standard
*Gloss.*—Better gloss than Standard
*Gloss retention.*—Better than Standard
*Drying.*—Good
*Hardness overnight.*—Equal to Standard
*Skin formation.*—No skin in 48 hours
*Settling.*—In 30 days equal to Standard If in the above formula the ester gum treated fish oil and a part of the limed rosin be replaced with the rosin-terpene hydrocarbon mixture to the extent of 58% of the non-volatile of the vehicle, the characteristics are very similar to those of the paint in which the linseed oil and part of the limed rosin are replaced by the rosin-terpene hydrocarbon mixture. It may be noted, however, that the paint in which the fish oil is replaced and the linseed oil retained has better brushing properties than the paint containing no linseed oil.

EXAMPLE 4

A known flat white wall paint formula is as follows:

67% pigment
- 76% rutile, titanium calcium pigment
- 24% precipitated calcium carbonate 33% vehicle
- 38% solids (limed rosin, linseed oil and dehydrated castor oil)
- 62% volatile-mineral spirits, etc. (oil length about 182 gallons)

In the above formula the rosin, dehydrated castor oil and part of the linseed oil were replaced with the rosin-terpene hydrocarbon mixture, to the extent of 64% of the vehicle solids. With this substitution, the paint was characterized as follows:

*Body of paint.*—Heavier than Standard
*Flow.*—Equal to Standard
*Brushing properties.*—Harder working than Standard
*Drying.*—Harder than Standard
*Skin formation.*—None observed
*Settling.*—Fair Satisfactory paints were secured in both of Examples 3 and 4, at substantially reduced cost, and in all cases the paint was free from re-liquefying of the drying ingredients.

I claim:

1. In a paint, a vehicle containing substantially non-volatile rosin ingredients as at least the major drying and film-forming constituents, said ingredients comprising treated rosin material prepared by heating rosin to a decarboxylation temperature in the presence of a decarboxylation promoting agent to partially decarboxylate said rosin, and said ingredients further being characterized by the presence of both rosin acids and rosin hydrocarbons, and the rosin ingredients having an acid value of from 20 to 120, and said vehicle being characterized by a high degree of wetting power, good top- and through-drying characteristics, and substantial freedom from reliquefying of the drying and film-forming ingredients after formation of the paint film.

2. A composition in accordance with claim 1 in which the acid value of the rosin ingredients is between about 60 and 80.

3. A composition in accordance with claim 1 and further incorporating a semi-drying fatty oil, the quantity of which is between 10% and 100% of the combined content of rosin acids and rosin hydrocarbons.

4. A composition in accordance with claim 1 in which the paint vehicle further incorporates a fatty oil in an amount less than the combined quantity of rosin acids and rosin hydrocarbons present.

5. A composition in accordance with claim 1 in which the paint vehicle further incorporates a semi-drying fatty oil in an amount less than the combined quantity of rosin acids and rosin hydrocarbons present.

6. A composition in accordance with claim 1 in which the paint vehicle further incorporates fish oil in an amount less than the combined quantity of rosin acids and rosin hydrocarbons present.

7. A composition in accordance with claim 1 in which the paint vehicle further incorporates soya bean oil in an amount less than the combined quantity of rosin acids and rosin hydrocarbons present.

8. A composition in accordance with claim 1 in which the paint vehicle further incorporates a drying fatty oil in an amount less than the combined quantity of rosin acids and rosin hydrocarbons present.

9. A composition in accordance with claim 1 in which the paint vehicle further incorporates linseed oil in an amount less than the combined quantity of rosin acids and rosin hydrocarbons present.

10. In a paint, a vehicle containing substantially non-volatile rosin ingredients as at least the major drying and film-forming constituents, said ingredients comprising at least three rosin materials including rosin acids, rosin hydrocarbons, and the reaction product of rosin and zinc carbonate prepared by heating at a decarboxylation temperature, and the rosin ingredients having an acid value of from 20 to 120, and said vehicle being characterized by a high degree of wetting power, good top- and through-drying characteristics, and substantial freedom from reliquefying of the drying and film-forming ingredients after formation of the paint film.

11. In a paint, a vehicle containing substantially non-volatile rosin ingredients as at least the major drying and film-forming constituents, said ingredients comprising treated rosin material prepared by application of heat at a decarboxylation temperature in the presence of a decarboxylation promoting agent, and under conditions avoiding appreciable distillation, the rosin ingredients including rosin acids and rosin hydrocarbons, and said ingredients having an acid value of from 20 to 120, and said vehicle being characterized by a high degree of wetting power, good top- and through-drying characteristics, and substantial freedom from reliquefying of the drying and film-forming ingredients after formation of the paint film.

LASZLÓ AUER.